United States Patent
Hanser et al.

(10) Patent No.: US 9,725,042 B1
(45) Date of Patent: Aug. 8, 2017

(54) RETRACTABLE STAIRCASE FOR A RECREATIONAL VEHICLE

(71) Applicant: HWH Corporation, Moscow, IA (US)

(72) Inventors: Paul Hanser, Tipton, IA (US); Vincent Buls, Tipton, IA (US)

(73) Assignee: HWH Corporation, Moscow, ID (US)

( * ) Notice: Subject to any disclaimer, the term of this patent is extended or adjusted under 35 U.S.C. 154(b) by 0 days.

(21) Appl. No.: 15/196,190

(22) Filed: Jun. 29, 2016

(51) Int. Cl.
*B60R 3/02* (2006.01)

(52) U.S. Cl.
CPC ....................................... *B60R 3/02* (2013.01)

(58) Field of Classification Search
CPC .............. B60R 3/00; B60R 3/02; B60R 3/007
USPC .......................... 280/163, 166, 169; 182/127
See application file for complete search history.

(56) References Cited

U.S. PATENT DOCUMENTS

| | | |
|---|---|---|
| 457,040 A | 8/1891 | Baugh |
| 3,291,504 A | 12/1966 | Antonio |
| 4,185,849 A | 1/1980 | Jaeger |
| 4,299,528 A | 11/1981 | Kazeil et al. |
| 4,623,160 A * | 11/1986 | Trudell ..................... B60R 3/02 182/127 |
| 5,228,707 A | 7/1993 | Yoder |
| 5,505,476 A | 4/1996 | Maccabee |
| 5,547,040 A | 8/1996 | Hanser et al. |
| 5,584,493 A | 12/1996 | Demski et al. |
| 5,957,237 A | 9/1999 | Tigner |
| 6,062,805 A | 5/2000 | Tremblay et al. |
| 6,082,751 A | 7/2000 | Hanes et al. |
| 6,213,486 B1 | 4/2001 | Kunz et al. |
| 6,425,627 B1 | 7/2002 | Gee |
| 6,655,706 B1 | 12/2003 | Murrell |
| 6,659,224 B2 | 12/2003 | Medsker |
| 6,880,843 B1 | 4/2005 | Greer, Jr. |
| 7,448,637 B2 * | 11/2008 | Parker ..................... E06C 1/005 182/88 |
| 7,857,337 B2 | 12/2010 | Ferguson et al. |
| 7,878,519 B2 * | 2/2011 | Hallmark .................. B60R 3/02 280/163 |
| 7,934,736 B2 | 5/2011 | Kircher |
| 8,002,298 B2 * | 8/2011 | Casbolt ..................... B60R 3/02 280/163 |
| 9,539,948 B1 * | 1/2017 | Presley ..................... B60R 3/02 |
| 2002/0003340 A1 | 1/2002 | Hallquist |
| 2005/0285365 A1 | 12/2005 | Manser et al. |
| 2006/0181049 A1 | 8/2006 | Kobayashi et al. |
| 2006/0267308 A1 | 11/2006 | Decker et al. |
| 2007/0205573 A1 | 9/2007 | Hallmark |
| 2007/0278760 A1 | 12/2007 | VanBelle et al. |
| 2007/0290475 A1 | 12/2007 | Reitinger |

* cited by examiner

*Primary Examiner* — John Walters
(74) *Attorney, Agent, or Firm* — Shuttleworth & Ingersoll, PLC; Jason Sytsma

(57) ABSTRACT

A first stationary rail and a second stationary rail are attached to the recreational vehicle. A first bearing pad is combined to the first stationary rail and a second bearing pad combined to the second stationary rail. A first sliding rail is engaged against the first bearing pad and a second sliding rail engaged against the second bearing pad. A first step positioned between the first sliding rail and the second sliding rail.

14 Claims, 4 Drawing Sheets

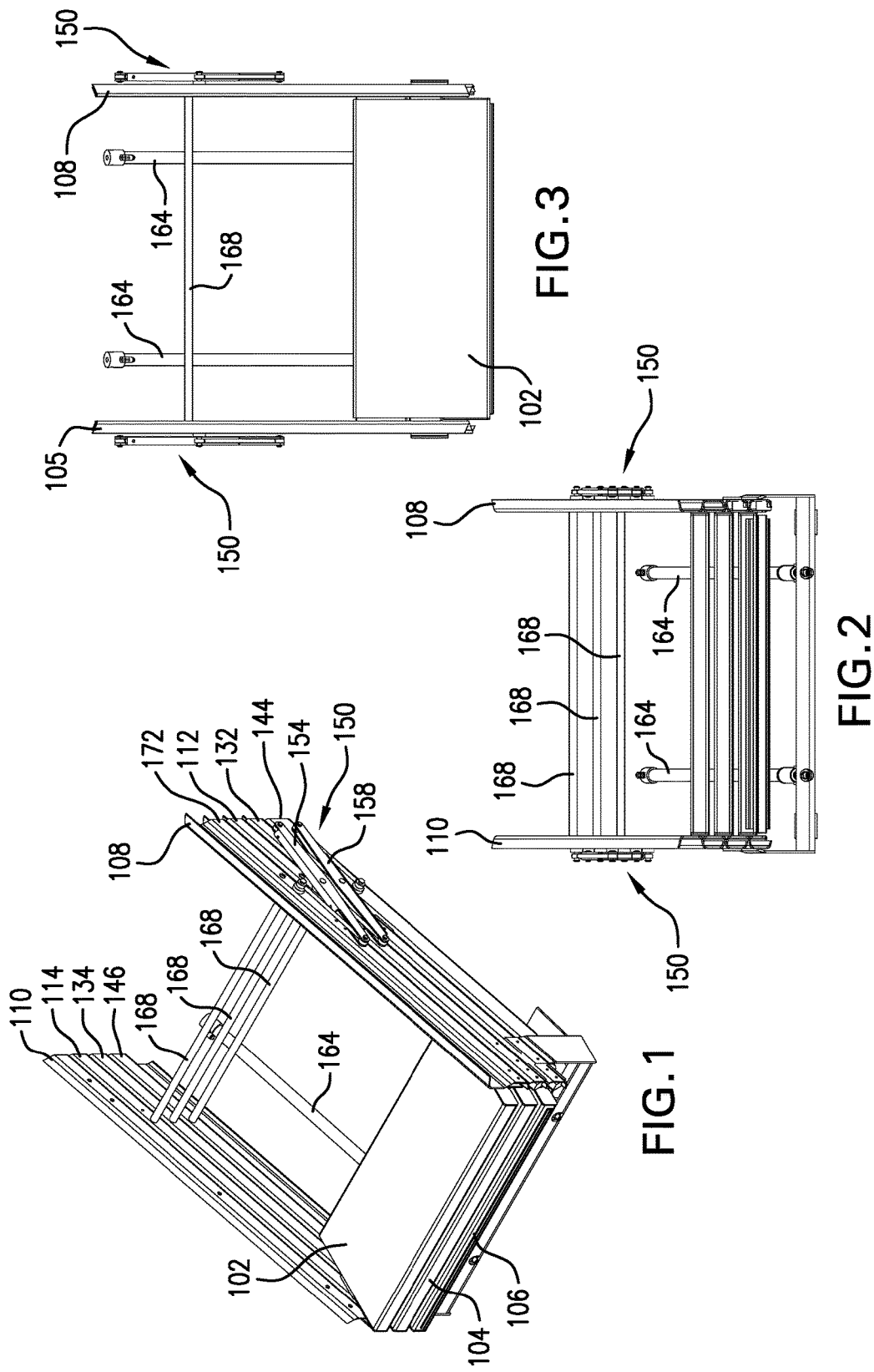

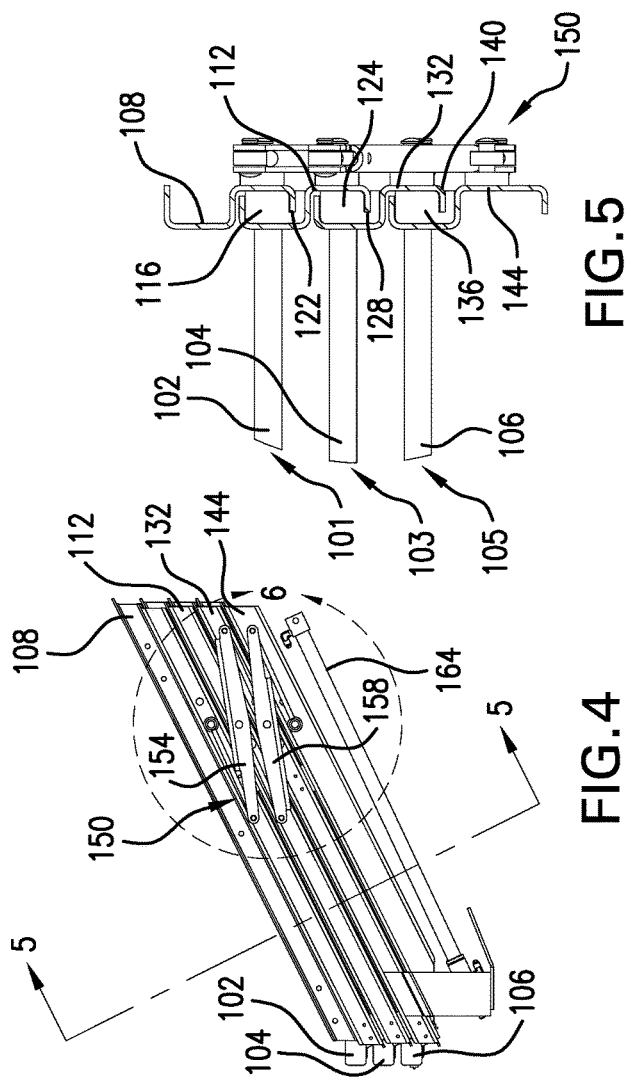

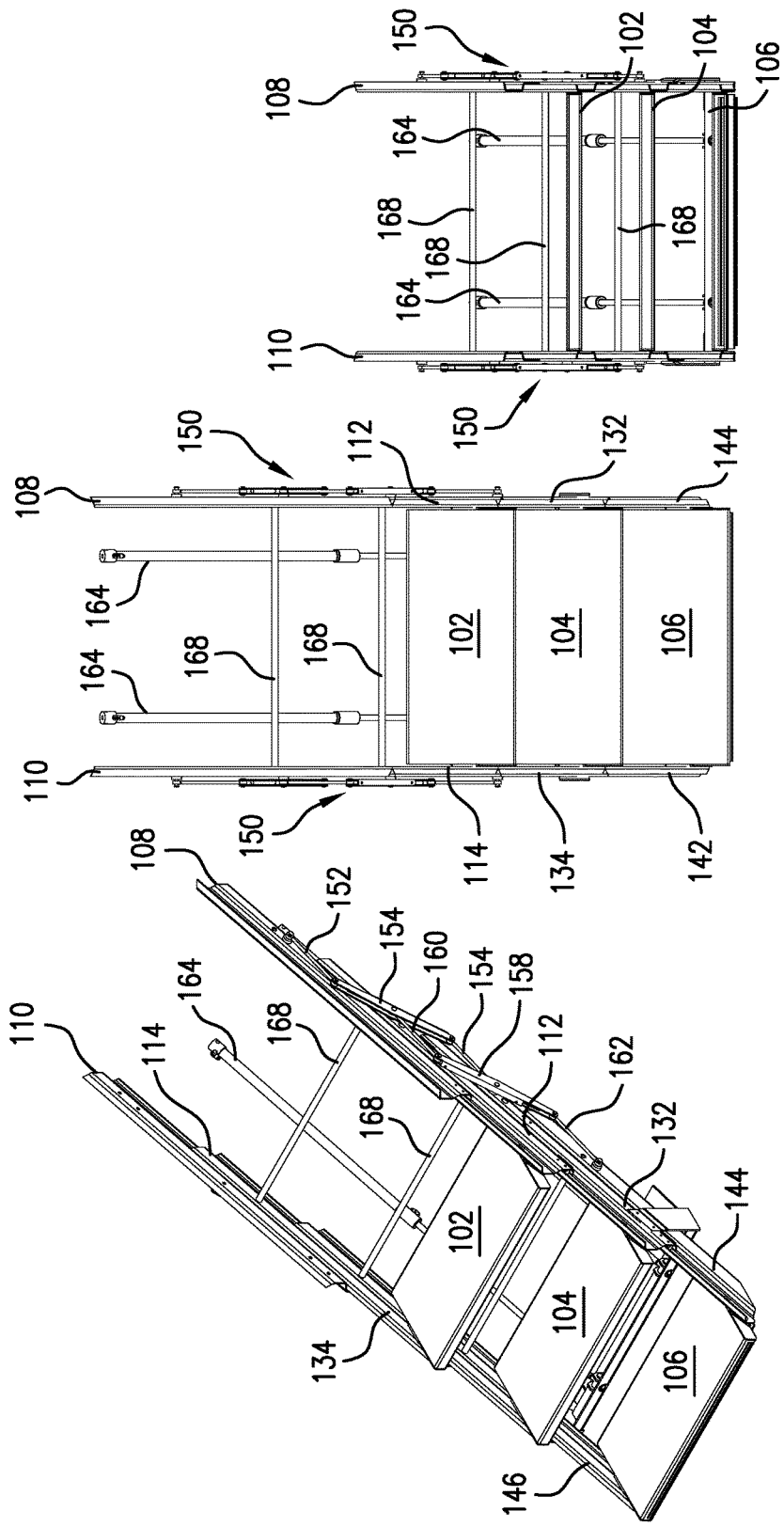

RETRACTABLE STAIRCASE FOR A RECREATIONAL VEHICLE

FIELD

This invention relates to a retractable staircase, and more specifically to a retractable staircase for use in a recreational vehicle.

BACKGROUND

The recreational vehicle (RV) industry has long employed ladders and step assemblies to assist entry and exit from the RV. Common RV design requires the use of five stairs to reach the main level due to the height from the ground. Typically, two external steps are used with three more inside the vehicle. When stairs are used inside the vehicle, however, the amount of useable floor space is greatly diminished.

In view of the foregoing, it is desirable to provide a retractable staircase for an RV that does not reduce the amount of useable floor area inside the vehicle.

SUMMARY

According to the present disclosure, there is provided a retractable staircase for a recreational vehicle. In one implementation, a first level is combined to the recreational vehicle. A second level is engaged with the first level and configured to move another step in a consistent parallel motion with respect to the step of the first level.

A first stationary rail and a second stationary rail are attached to the recreational vehicle. A first bearing pad is combined to the first stationary rail and a second bearing pad combined to the second stationary rail. A first sliding rail is engaged against the first bearing pad and a second sliding rail engaged against the second bearing pad.

The sliding rails can be s-shaped so that each rail overlaps the rail beneath it. Each rail can include a penetration end that engages by penetration a bearing pad upon which the rail beneath it slides.

A timing arm combines the first step and the second step to synchronize movement of the first step and the second step between the retracted position and the extended position. A prime mover can be combined to one of the sliding rails to move the first step between a retracted position and an extended position.

Other aspects, features, and embodiments of the invention will become apparent upon review of the following description taken in connection with the accompanying drawings. The invention, though, is pointed out with particularity by the appended claims.

BRIEF DESCRIPTION OF THE DRAWINGS

For a more complete understanding of particular embodiments and their features and advantages, reference is now made to the following description, in which:

FIG. 1 is a perspective view of a retractable staircase in a retracted position.

FIG. 2 is a front view of the retractable staircase of FIG. 1 in the retracted position.

FIG. 3 is a top view of the retractable staircase of FIG. 1 in the retracted position.

FIG. 4 is a side view of the retractable staircase of FIG. 1 in the retracted position.

FIG. 5 is a front view of the retractable staircase of FIG. 1 shown along the line 5-5 of FIG. 4 in the retracted position.

FIG. 6 is a close-up side view of the retractable staircase of FIG. 1 of the area 6 of FIG. 4 in the retracted position.

FIG. 7 is a perspective view of the retractable staircase of FIG. 1 in an extended position.

FIG. 8 is a top view of the retractable staircase of FIG. 1 in the extended position.

FIG. 9 is a front view of the retractable staircase of FIG. 1 in the extended position.

DETAILED DESCRIPTION

Figure 11:
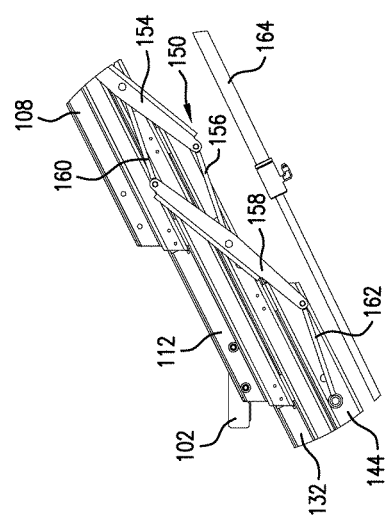
FIG. 11 is a side view of the retractable staircase of FIG. 1 of area 11 of FIG. 10 in the extended position.
Figure 10:
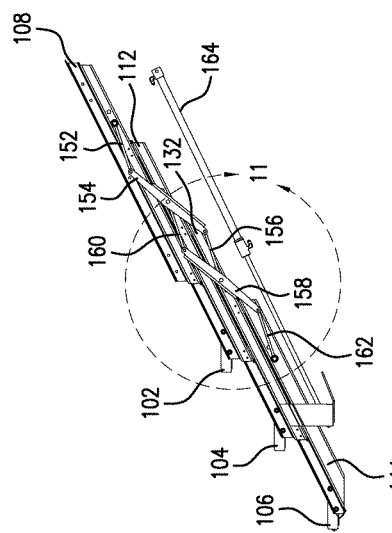
FIG. 10 is a side view of the retractable staircase of FIG. 1 in the extended position.

Reference will now be made to the drawings wherein like numerals refer to like parts throughout. FIGS. 1-11 show a retractable stair case 100 for a recreational vehicle. Retractable stair case 100 is shown in a retracted position underneath the body of recreational vehicle in FIGS. 1-6 and an extended position out in front of the exit door to the recreational vehicle in FIGS. 7-11. Retractable stair case 100 includes at least one first step 102; however, additional steps, such as second step 104 and third step 106 are also contemplated. In practice, retractable stair case 100 can include any number of steps depending on the height of recreational vehicle off of the ground and the depth of each step.

FIG. 5 shows that retractable stair case 100 comprises of three levels, a first 101, a second level 103, and a third level 105, with each comprising a step (first step 102, second step 104, and third step 106, respectively) positioned relative to a left and right sliding rail. Each sliding rail, as discussed below, is overlapped by the rail above it. This allows any number of levels to be added to the foregoing disclosure.

Retractable stair case 100 includes a first stationary rail 108 and a second stationary rail 110 that are each configured for mounting to the body or other stationary portions of the recreational vehicle. Each first stationary rail 108 and second stationary rail 110 overlaps one of a first sliding rail 112 and a second sliding rail 114 (as more clearly shown in FIG. 5). Movement of first sliding rail 112 and second sliding rail 114 is about a corresponding first bearing pad 116 and a second bearing pad 118 attached at a penetration end 120, 122 of first stationary rail 108 and second stationary rail 110, respectively. This configuration secures the respective bearing pad 116, 118 to first stationary rail 108 and second stationary rail 110 to provide a reduced friction sliding surface for the respective first sliding rail 112 and second sliding rail 114 as first sliding rail 112 and second sliding rail 114 move between the retracted position underneath the body of the recreational vehicle and the extended position out in front of the exit door to the recreational vehicle. An additional bearing pad is provided about half way up each of first stationary rail 108 and second stationary rail 110. The two pads one each of first stationary rail 108 and second stationary rail 110 maintain the first stationary rail 108 and second stationary rail 110 parallel with each other.

First sliding rail 112 and second sliding rail 114 move parallel with respect to first stationary rail 108 and second stationary rail 110. First bearing pad 116 and second bearing pad 118 align the respective first sliding rail 112 and second sliding rail 114 with respect to first stationary rail 108 and second stationary rail 110 for the parallel movement. First step 102 is combined at each side to one of first sliding rail 112 and second sliding rail 114 and configured parallel with respect to the ground. Combining step 102 to each one of first sliding rail 112 and second sliding rail 114 further secures first sliding rail 112 and second sliding rail 114 for parallel movement with each other, and also maintains the parallel position of first step 102 with respect to the ground. In this regard, first step 102 maintains a consistent parallel motion as first step 102 moves between the respective positions, and in the extend position is positioned parallel with respect to the ground.

Additional levels (a second level 103 and third level 105) can be provided to add second step 104 and third step 106, respectively. A third bearing pad 124 and a fourth bearing pad 126 are each attached to a penetration end 128, 130 of first sliding rail 112 and second sliding rail 114, respectively. A third sliding rail 132 and a fourth sliding rail 134 are overlapped by respective first sliding rail 112 and second sliding rail 114 and positioned for sliding relative movement with respect to third bearing pad 124 and fourth bearing pad 126, respectively. Second step 104 is combined at each end to one of third sliding rail 132 and fourth sliding rail 134 and configured for parallel movement with respect to first step 102. Combining second step 104 to each one of third sliding rail 132 and fourth sliding rail 134 further secures third sliding rail 132 and fourth sliding rail 134 for parallel movement with each other, and also maintains the parallel movement of second step 104 with respect to first step 102.

In a similar manner third step 106 can be added. A fifth bearing pad 136 and a sixth bearing pad 138 are each attached to a penetration end 140, 142 of third sliding rail 132 and fourth sliding rail 134, respectively. A fifth sliding rail 144 and a sixth sliding rail 146 are overlapped by respective third sliding rail 132 and fourth sliding rail 134 and positioned for sliding relative movement with respect to fifth bearing pad 136 and sixth bearing pad 138, respectively. Third step 106 is combined at each end to one of fifth sliding rail 144 and sixth sliding rail 146 and configured parallel with respect to first step 102 and second step 104. Combining third step 106 to each one of fifth sliding rail 144 and sixth sliding rail 146 further secures fifth sliding rail 144 and sixth sliding rail 146 for parallel movement with each other, and also maintains the parallel movement of third step 106 with respect to first step 102 and second step 104. One can clearly see how additional levels can be provided.

Each first stationary rail 108, second stationary rail 110, first stationary rail 108 and second stationary rail 110, third sliding rail 132 and fourth sliding rail 134, fifth sliding rail 144 and sixth sliding rail 146 can be formed into an "s" shape so that each upper rail overlaps the immediately lower rail with the lower portion of the "s" shape forming the penetrating portion to secure the corresponding bearing pad. The upper portion of the "s" of the rail includes the surface that engages the bearing pad secured by the upper rail.

The rails are secured for synchronous movement by a timing mechanism 150. Timing mechanism 150 includes a series of timing arms arranged as a parallel linkage combining each timing arm to one of the stationary rails or the sliding rails. Timing mechanism 150 comprises a first timing arm 152 pivotally combined at one end to first stationary rail 108 and at the other end pivotally combined to a second timing arm 154. Second timing arm 154 is pivotally combined near a center to first sliding rail 112 and pivotally combined to a third timing arm 156 at the other end. Third timing arm 156 is pivotally combined the other end near a center of a fourth timing arm 158 and to the third sliding rail 132. Fourth timing arm 158 is pivotally combined at one end to a fifth timing arm 160 and pivotally combined the other end to a sixth timing arm 162. Fifth timing arm 160 is combined at the other end near a center of second timing arm 154 and to first sliding rail 112. Sixth timing arm 162 is combined at the other end to fifth sliding rail 144. Timing mechanism 150 can be provided on one side of the steps or the other side or both sides of the steps, as illustrated.

Movement of first level 101, second level 103, and third level 105 is accomplished by at least one prime mover 164. Prime movers 164 are a source of motive power for first level 101, second level 103, and third level 105. Prime movers 164 can include a hydraulic cylinder and pneumatic cylinder, an electric cylinder, or the like. Driving first level 101, second level 103, and third level 105 can be achieved by moving any of the sliding rails or the steps (102, 104, 106). The steps (102, 104, 106) can be moved one level (101, 103, 105) relative to another level (101, 103, 105). Another way the steps can be moved is to move one level relative to the stationary point on the recreational vehicle. Prime mover 164 can be mounted to a stationary point on one end of the recreational vehicle and then to one of the steps (102, 104, 106) at the other end. Prime mover 164 can be connected to the middle, second level 103 at second step 104 at a point that positions prime mover 164 for ease of use. The stroke and stationary mount for prime mover 164 can change depending on its mounting location.

Each of first level 101, second level 103, and third level 105 can be secured to prevent twisting motion by a cross member 168 that extends between each of the corresponding sliding rails, that is between first sliding rail 112 and second sliding rail 114, between third sliding rail 132 and fourth sliding rail 134, and between fifth sliding rail 144 and sixth sliding rail 146.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. A retractable stair case for a recreational vehicle, comprising:
    a first stationary rail attached to the recreational vehicle and a second stationary rail attached to the recreational vehicle;
    a first bearing pad combined to the first stationary rail and a second bearing pad combined to the second stationary rail;
    a first sliding rail engaged against the first bearing pad and a second sliding rail engaged against the second bearing pad;
    a first step positioned between the first sliding rail and the second sliding rail; and
    a prime mover engaged with the first step to move the first step between a retracted position and an extended position.

2. The retractable stair case of claim 1, and further comprising a third bearing pad attached to the first sliding rail, a fourth bearing pad attached to the second sliding rail, a third sliding rail engaged against the third bearing pad, a fourth sliding rail engaged against the fourth bearing pad, and a second step between the third sliding rail and the fourth sliding rail.

3. The retractable stair case of claim 2, and further comprising a timing arm combining the first step and the second step to synchronize movement of the first step and the second step between the retracted position and the extended position.

4. The retractable stair case of claim 3, wherein the timing arm is combined at one end to one of a first sliding rail and the second sliding rail and the timing arm is combined at another end to a corresponding one of the third sliding rail and the fourth sliding rail.

5. The retractable stair case of claim 4, wherein the prime mover is combined to one of the first sliding rail, the second sliding rail, the third sliding rail, and the fourth sliding rail to move the first step between a retracted position and an extended position.

6. The retractable stair case of claim 5, wherein the first stationary rail and the second stationary rail are each formed with a penetration end that engages by penetration the respective first bearing pad and the second bearing pad.

7. The retractable stair case of claim 2, and further comprising a third bearing pad attached to the first sliding rail, a fourth bearing pad attached to the second sliding rail, a third sliding rail engaged against the third bearing pad, a fourth sliding rail engaged against the fourth bearing pad, and a second step between the third sliding rail and the fourth sliding rail, wherein the first sliding rail has another portion that overlaps a portion of the third sliding rail, and wherein the second sliding rail has another portion that overlaps a portion of the fourth sliding rail.

8. The retractable stair case of claim 2, and further comprising a fifth bearing pad attached to the third sliding rail, a sixth bearing pad attached to the fourth sliding rail, a fifth sliding rail engaged against the fifth bearing pad, a sixth sliding rail engaged against the sixth bearing pad, and a third step between the fifth sliding rail and the sixth sliding rail.

9. The retractable stair case of claim 8, and further comprising a timing mechanism arranged as a parallel linking combining the first step, the second step, and the third step to synchronize movement of the first step, the second step, and the third step between the retracted position and the extended position, wherein the timing mechanism further comprises a first timing arm pivotally combined at one end to the first stationary rail and at another end pivotally combined to a second timing arm, the second timing arm pivotally combined near a center to the first sliding rail and pivotally combined to a third timing arm at another end, the third timing arm pivotally combined at another end near a center of a fourth timing arm and to the third sliding rail, the fourth timing arm pivotally combined at an end to a fifth timing arm and pivotally combined an another end to a sixth timing arm, the fifth timing arm combined at another end near a center of the second timing arm and to the first sliding rail, and the sixth timing arm combined at an end to the fifth sliding rail.

10. The retractable stair case of claim 1, wherein the first stationary rail has a portion that overlaps a portion of the first sliding rail, and wherein the second stationary rail has a portion that overlaps a portion of the second sliding rail.

11. A retractable stair case for a recreational vehicle, comprising:
   a first level further comprising a step, wherein the first level is combined to the recreational vehicle, wherein the first level further comprises of a first stationary rail and a second stationary rail each attached to the recreational vehicle and each first stationary rail and second stationary rail having combined thereto a bearing pad, and a first sliding rail and a second sliding rail each engaged with the bearing pad for sliding relative movement with respect to the first stationary rail and the second stationary rail, respectively, wherein the step is positioned between the first sliding rail and the second sliding rail.

12. The retractable stair case of claim 11, and further comprising a second level further comprising a step, wherein the second level is engaged with the first level and configured to move the step in a consistent parallel motion with the step of the first level, wherein the second level further comprises of a pair of bearing pads each engaged to one of the first sliding rail and the second sliding rail of the first level, and a pair of sliding rails each engaged to one of the bearing pads and configured for sliding movement with respect to the bearing pads, wherein the step of the second level is positioned between the pair of sliding rails of the second level.

13. The retractable stair case of claim 12, and further comprising a prime mover engaged with one of the first level and the second level to move each of the step in the first level and the step of the second level between the retracted position and the extended position.

14. The retractable stair case of claim 13, and further comprising a timing mechanism linking the first level and the second level for movement with each other.

* * * * *